United States Patent Office

2,774,694
Patented Dec. 18, 1956

2,774,694

PROCESS FOR THE DESCALING OF SUGAR FACTORY EVAPORATORS AND OTHER HEAT TRANSFER EQUIPMENT

Leslie Frederick Wiggins, St. Augustine, Trinidad, British West Indies

No Drawing. Application September 30, 1954, Serial No. 459,529

Claims priority, application Great Britain October 15, 1953

9 Claims. (Cl. 134—13)

This invention relates to the descaling of sugar factory evaporators and other heat transfer equipment by the use of chemicals.

The invention consists in treating the heat transfer equipment with an alkaline solution of a sequestering agent consisting of the tetra-sodium salt of ethylene diamine tetra-acetic acid, and subsequently effecting precipitation of the dissolved substance and recovery of the said agent by means of an acid, and an alkali metal salt.

The formation of scale in sugar factory evaporators and in juice heaters and in other heat transfer equipment is often a troublesome phase of sugar manufacture insofar as the scale, which consists most often of calcium and magnesium salts of such acids as suphuric, phosphoric, silicic, aconitic, oxalic and citric, is very difficult to remove. Present methods of cleaning the surfaces may involve mechanical cleaning with rotary cutting tools and brushes either alone or in conjunction with chemical cleaning. Neither mechanical cleaning of the tube in evaporators nor cleaning with caustic soda or soda ash or a combination of these with acids or other known methods results in perfect removal of the scale.

Moreover, the time involved in scale removal by the usual methods often results in serious reduction of the output of the sugar manufacturing plant.

The invention described herein is designed to minimize the time required for cleaning the heat transfer equipment of a sugar factory, but may find application in other industries also. It has been found that the scale adhering to the heat transfer equipment of a sugar factory may be wholly or partly dissolved (any residue being removed as discrete pieces) by boiling the vessel with a solution of the tetra-sodium salt of ethylene diamine tetra-acetic acid. This alone however of itself may be of doubtful value to the sugar industry, owing to the cost of the ethylene diamine tetra-acetic acid salt. By the invention, however, efficient methods have been devised for recovery of this substance after use. When the sodium salt of ethylene diamine tetra-acetic acid dissolves scale it does so by sequestering the calcium and magnesium and other metal ions in the scale, so dissolving the scale. The complexes so formed may however be decomposed by acids which form insoluble salts with the metals taking part in the complex. By this procedure the ethylene diamine tetra-acetic acid as such or in a partial salt form, such as the disodium salt, is liberated and the calcium salts precipitated. The precipitate may be removed by filtration or decantation and the ethylene diamine tetra-acetic acid made ready for further use by the addition of alkali to a pH of about 11. The acid used may be sulphuric acid alone or in admixture with soluble sulphates, with which precipitation of calcium salts takes place at a pH below 6, or phosphoric acid alone or in admixture with soluble phosphates, giving precipitation of calcium salts at similar pH values, or hydrofluoric acid or mixtures of this and sodium fluoride or other soluble fluorides in which cases precipitation of calcium fluoride and magnesium fluoride takes place at a pH of about 5. The process is not limited to the use of the above acids. For example, sulphur dioxide may also be used to decompose the complex of ethylene diamine tetra-acetic acid sodium salt and metal ions. Thus, by the use of this process, sugar factory evaporators or other heat transfer equipment may be repeatedly cleaned with the same ethylene diamine tetra-acetic acid.

The invention may be illustrated by the following typical examples:

*Example 1*

Calcium sulphate (50 g.) suspended in 500 cc. water was boiled with the tetra-sodium salt of ethylene diamine tetra-acetic acid in 500 cc. water for about 1 hour. The calcium sulphate was thereby dissolved completely. Sodium sulphate and dilute sulphuric acid was then added to bring the pH to 2.8. The precipitated calcium sulphate was removed by decantation. The clear liquid was then made alkaline to a pH of about 11 with caustic soda solution and was then ready to dissolve further quantities of calcium sulphate. In subsequent regenerations of ethylene diamine tetra-acetic acid no further quantities of sodium sulphate were needed to be added with the acid. Six such treatments were achieved with the same initial quantity of tetra-sodium salt of ethylene diamine tetra-acetic acid.

*Example 2*

Calcium oxalate (50 g.) in 500 cc. water was boiled with tetra-sodium ethylene diamine tetra-acetic acid dissolved in 500 cc. water for 1 hour. The calcium oxalate was completely dissolved. Hydrofluoric acid was added to the solution until a pH of about 5 was reached, followed by the requisite amount of sodium fluoride to precipitate the calcium fluoride. The precipitate was removed by decantation or filtration and the clear filtrate made alkaline with caustic soda to a pH of about 11. This solution was then used again to dissolve more calcium oxalate. The process was repeated many times without undue loss of ethylene diamine tetra-acetic acid.

*Example 3*

Calcium sulphate (50 g.) in 500 cc. water was boiled with tetra-sodium ethylene diamine tetra-acetic acid dissolved in 500 cc. water for 1 hour. The calcium sulphate was completely dissolved. Hydrochloric acid was added to the solution until a pH of about 5 was reached, followed by the requisite amount of sodium fluoride, to precipitate the calcium as calcium fluoride. The precipitate was removed by decantation or filtration and the clear filtrate made alkaline with caustic soda to a pH of about 11.

This solution was then used again to dissolve more calcium sulphate. The process was repeated many times without undue loss of ethylene diamine tetra-acetic acid.

*Example 4*

A solution of tetra-sodium salt of ethylene diamine tetra-acetic acid of concentration 5% (weight/volume) or greater, was placed in the sugar factory evaporator requiring cleaning. The vessel was then heated and the solution brought into contact by spraying with the inside surfaces of the evaporator. After continuing this treatment for about an hour the evaporator was effectively clean and the solution was removed by a filter or strainer so that pieces of scale separated from the heating surfaces but not dissolved were removed before combining with the ethylene diamine tetra-acetic acid sodium salt. The solution was then treated in a suitable tank with hydrofluoric acid and sodium fluoride to precipitate metal fluoride and to release the ethylene diamine tetra-acetic acid sodium salt from its complex with the metal ions. After removing the precipitate, the solution was made alkaline with caustic soda to about pH 11 and the solution was then ready for subsequent use.

*Example 5*

A solution of tetra-sodium salt of ethylene diamine tetra-acetic acid of concentration 5% (weight/volume) or greater, was placed in the sugar factory evaporator requiring cleaning. The vessel was then heated and the solution brought into contact with the inside surfaces of the evaporator by spraying. After continuing this treatment for about an hour the evaporator was effectively clean and the solution was removed by a filter or strainer so that pieces of scale separated from the heating surfaces but not dissolved were removed before combining with the ethylene diamine tetra-acetic acid sodium salt. The solution was then treated in a suitable tank with sulphuric acid and sodium sulphate to precipitate metal sulphate and to release the ethylene diamine tetra-acetic acid sodium salt from its complex with the metal ions. After removing the precipitate, the solution was made alkaline with caustic soda to about pH 11, and the solution was then ready for subsequent use.

*Example 6*

A solution of tetra-sodium salt of ethylene diamine tetra-acetic acid of concentration 5% (weight/volume) or greater, was placed in the sugar evaporator requiring cleaning. The vessel was then heated and the solution brought into contact with the inside surfaces of the evaporator by spraying. After continuing for about one hour, the solution was then treated in a tank with sulphuric acid and sodium sulphate to precipitate metal sulphate and to release the ethylene diamine tetra-acetic acid sodium salt from its complex with the metal ions. After removing the precipitate the solution was made alkaline with caustic soda to about pH 11, and the solution was then ready for subsequent use.

*Example 7*

A solution of tetra-sodium salt of ethylene diamine tetra-acetic acid of concentration 5% (weight/volume) or greater, was placed in the evaporator requiring cleaning, to the level of the tube plate. The solution was then boiled by applying steam to the tubes. Later the solution was treated in a tank with sulphuric acid as described in Example 6.

Having thus described my invention what I claim as new and desire to secure by Letters Patent is:

1. A process for the de-scaling of sugar factory evaporators and other heat transfer apparatus consisting in treating the apparatus with a hot alkaline solution of a sequestering agent consisting of the tetra-sodium salt of ethylene diamine tetra-acetic acid, and later recovering the said agent by bringing the pH value of the solution to about 2.5, removing the precipitate from the solution, and subsequently making the solution alkaline to about pH 11 with an alkali metal hydroxide.

2. A process as claimed in claim 1, in which the sequestering agent is circulated in a hot condition through sprays or jets, screening the solution as it leaves the apparatus, and subsequently regenerating the said agent.

3. A process as claimed in claim 2, in which the sequestering agent is boiled in the apparatus.

4. A process as claimed in claim 1 in which the solution is brought to the pH value of about 2.5 by the addition of sulphuric acid.

5. A process as claimed in claim 1, in which the solution is brought to the pH value of about 2.5 by the addition of a mixture of sulphuric and oxalic acids.

6. A process as claimed in claim 1, in which the solution is brought to the pH value of about 2.5 by the addition of a mixture of sulphuric and phosphoric acids.

7. A process as claimed in claim 1, in which the solution is brought to the pH value of about 2.5 by a solution of hydrofluoric acid.

8. A process as claimed in claim 1, in which the solution is brought to the pH value of about 2.5 by a mixture of sulphuric and hydrofluoric acids.

9. A process as claimed in claim 1, in which the sequestering agent is admixed with an alkali metal sulphate before removal of the precipitate.

No references cited.